United States Patent
Pierpont

(10) Patent No.: US 6,658,848 B1
(45) Date of Patent: Dec. 9, 2003

(54) AIRFLOW SYSTEM FOR ENGINE WITH SERIES TURBOCHARGERS

(75) Inventor: David Andrew Pierpont, Peroia, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/143,799

(22) Filed: May 14, 2002

(51) Int. Cl.$^7$ .................. F02B 33/44; F02B 37/00
(52) U.S. Cl. .................................. 60/602; 60/612
(58) Field of Search .................. 60/600, 602, 612

(56) References Cited

U.S. PATENT DOCUMENTS

| | | | |
|---|---|---|---|
| 5,447,031 A | 9/1995 | Betts et al. .............. | 60/603 |
| 5,899,070 A | 5/1999 | Droessler et al. ......... | 60/612 |
| 5,974,801 A | 11/1999 | Houtz .................... | 60/602 |
| 6,012,289 A | 1/2000 | Deckard et al. ........... | 60/602 |
| 6,055,811 A | 5/2000 | Maddock et al. ........... | 60/602 |
| 6,178,748 B1 | 1/2001 | Oleksiewicz .............. | 60/602 |
| 6,256,992 B1 | 7/2001 | Lewis, Jr. et al. ........ | 60/603 |
| 6,311,493 B1 * | 11/2001 | Kurihara et al. .......... | 60/600 |
| 6,378,308 B1 | 4/2002 | Pflüger .................. | 60/612 |

FOREIGN PATENT DOCUMENTS

| | | | | |
|---|---|---|---|---|
| JP | 60169630 A | * | 9/1985 | ........ F02B/37/00 |
| JP | 61178519 A | * | 8/1986 | ........ F02B/37/00 |
| JP | 62101834 A | | 5/1987 | |
| JP | 01142214 A | | 6/1989 | |
| JP | 04017725 A | | 1/1992 | |

OTHER PUBLICATIONS

Co-pending U.S. Patent Application No. 10/144,029, filed May 14, 2002, entitled *Airflow System For Engine With Series Turbochargers*, Applicant –James J. Faletti.

* cited by examiner

*Primary Examiner*—Sheldon J. Richter
(74) *Attorney, Agent, or Firm*—Finnegan, Henderson, Farabow, Garrett & Dunner

(57) ABSTRACT

An airflow system for an engine includes a first turbine coupled with a first compressor and a second turbine coupled with a second compressor. The first turbine receives exhaust from the engine, and the first compressor supplies compressed air to the engine. The second compressor compresses air from atmosphere. A first conduit fluidly couples the first and second turbines, and a second conduit fluidly couples the first and second compressors. A wastegate valve is fluidly coupled with the exhaust manifold and movable between a first position in which exhaust fluid is allowed to bypass the first turbine and a second position in which fluid is restricted from bypassing. The airflow system includes a third conduit fluidly coupling the second compressor and the wastegate valve. The wastegate valve moves to the first position when compressed air in the third conduit has at least a predetermined pressure.

20 Claims, 1 Drawing Sheet

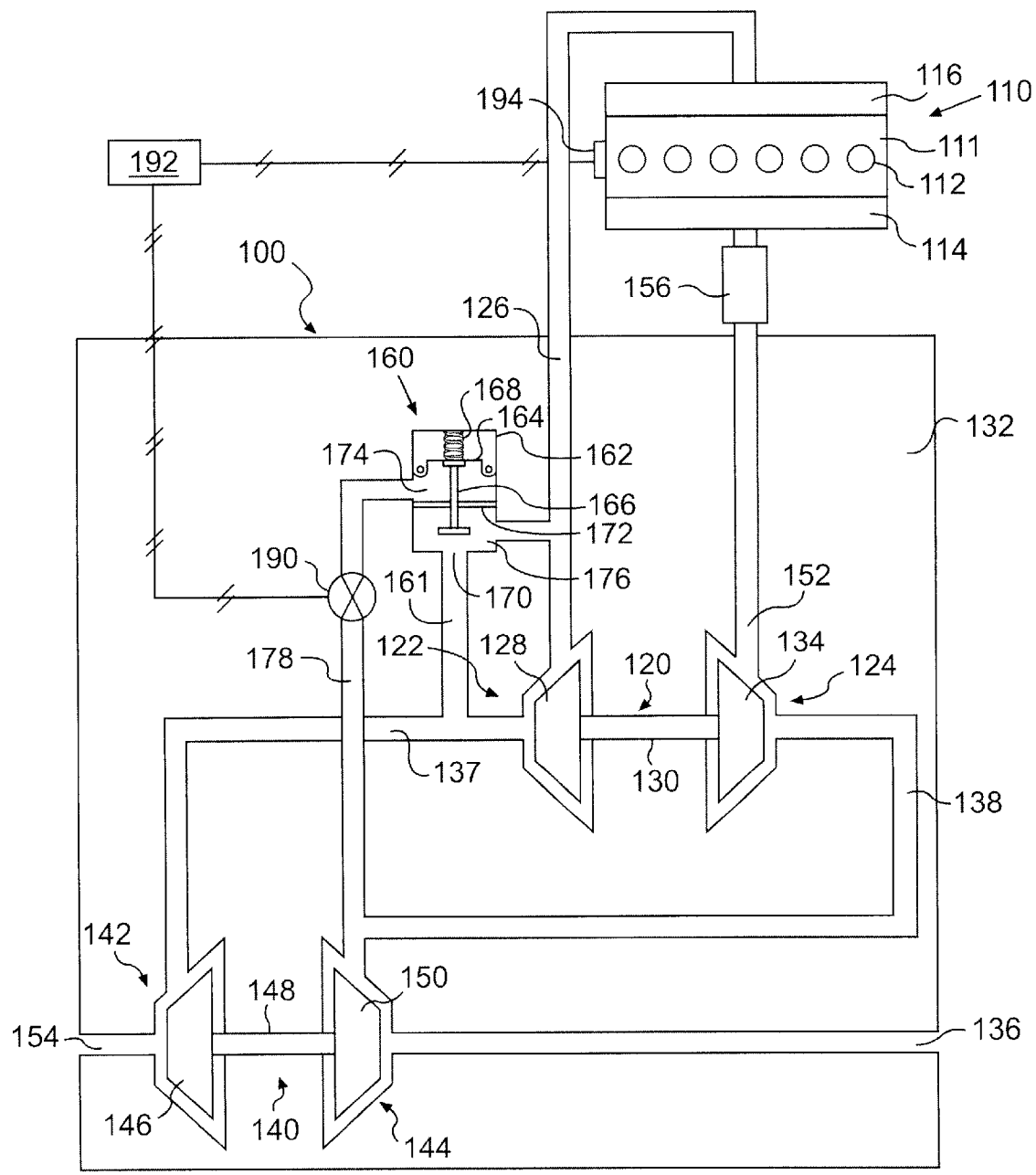

AIRFLOW SYSTEM FOR ENGINE WITH SERIES TURBOCHARGERS

TECHNICAL FIELD

The present invention relates to a combustion engine and, more particularly, to an airflow control system for an internal combustion engine having series turbochargers.

BACKGROUND

An internal combustion engine may include one or more turbochargers for compressing a fluid, which is supplied to one or more combustion chambers within corresponding combustion cylinders. Each turbocharger typically includes a turbine driven by exhaust gases of the engine and a compressor driven by the turbine. The compressor receives the fluid to be compressed and supplies the compressed fluid to the combustion chambers. The fluid compressed by the compressor may be in the form of combustion air or an air/fuel mixture.

An internal combustion engine having series turbochargers may include a wastegate valve between the exhaust manifold and the turbine section. As disclosed in U.S. Pat. No. 5,974,801 (issued to Houtz on Nov. 2, 1999), the wastegate valve may be actuated by compressed air from the intake manifold of the engine or an independent compressed air source. When actuated, the wastegate valve may bypass exhaust gas around the turbines.

Since compressed air from the high pressure compressor of series turbochargers is at high pressure and temperature, the wastegate valve must be made of materials capable of withstanding the high pressure and temperature. Such materials can greatly increase the cost of wastegate valve. However, using an independent compressed air source to provide compressed air to the wastegate requires the undesirable costs of an additional compressor and the energy to compress the air.

The present invention is directed to overcoming one or more of the problems as set forth above.

SUMMARY OF THE INVENTION

According to one exemplary aspect of the invention, an airflow system for an internal combustion engine having an intake manifold and an exhaust manifold is provided. The airflow system may include a first turbocharger including a first turbine coupled with a first compressor. The first turbine may be configured to receive exhaust flow from the exhaust manifold, and the first compressor may be configured to supply compressed air to the intake manifold. A second turbocharger may include a second turbine coupled with a second compressor, wherein the second compressor is configured to compress air drawn from atmosphere. The airflow system may also include a first conduit providing fluid communication between the first turbine and the second turbine, and a second conduit providing fluid communication between the second compressor and the first compressor. A wastegate valve is fluidly coupled with the exhaust manifold and movable between a first position and a second position. The first position allows fluid flow exhausted by the engine to bypass the first turbine, and the second position restricts fluid flow exhausted by the engine from bypassing the first turbine. The airflow system includes a third conduit providing fluid communication between the second compressor and the wastegate valve. The wastegate valve is moved to the open position at times when compressed air in the third conduit has at least a predetermined pressure.

According to another exemplary aspect of the invention, an internal combustion engine includes an intake manifold, an exhaust manifold, and an engine block. The engine block defines at least one cylinder being configured to receive compressed air via the intake manifold, and the exhaust manifold is configured to receive exhaust flow from the cylinder. The engine also includes a first turbocharger and a second turbocharger. The first turbocharger includes a first turbine coupled with a first compressor. The first turbine may be configured to receive exhaust flow from the exhaust manifold, and the first compressor may be configured to supply compressed air to the intake manifold. The second turbocharger may include a second turbine coupled with a second compressor, wherein the second compressor is configured to compress air drawn from atmosphere. The airflow system may also include a first conduit providing fluid communication between the first turbine and the second turbine, and a second conduit providing fluid communication between the second compressor and the first compressor. A wastegate valve is fluidly coupled with the exhaust manifold and movable between a first position and a second position. The first position allows fluid flow exhausted by the engine to bypass the first turbine, and the second position restricts fluid flow exhausted by the engine from bypassing the first turbine. The airflow system includes a third conduit providing fluid communication between the second compressor and the wastegate valve. The wastegate valve is moved to the open position while compressed air in the third conduit has at least a predetermined pressure.

According to yet another exemplary aspect of the invention, a method of controlling airflow to an internal combustion engine having an air intake manifold and an exhaust manifold is provided. The method may include imparting rotational movement to a first turbine and a first compressor of a first turbocharger with exhaust air flowing from the exhaust manifold of the engine. The method may also include imparting rotational movement to a second turbine and a second compressor of a second turbocharger with exhaust air flowing from an exhaust duct of the first turbocharger. The method may further include compressing air drawn from atmosphere with the second compressor and compressing air received from the second compressor with the first compressor. The method may also include supplying compressed air from the first compressor to the air intake manifold and supplying compressed air from the second compressor to a wastegate valve to control flow of the exhaust air from the exhaust manifold to the first turbine.

It is to be understood that both the foregoing general description and the following detailed description are exemplary and explanatory only and are not restrictive of the invention.

BRIEF DESCRIPTION OF THE DRAWINGS

The accompanying drawing, which is incorporated in and constitutes a part of this specification, illustrates an exemplary embodiment of the invention and, together with the description, serves to explain the principles of the invention.

The FIGURE is a combination diagrammatic and schematic illustration of an exemplary airflow system for an internal combustion engine in accordance with the invention.

DETAILED DESCRIPTION

Referring to the FIGURE, an exemplary airflow system 100 for an internal combustion engine 110 is shown. The engine 110 includes an engine block 111 defining a plurality of combustion cylinders 112, the number of which depends upon the particular application. For example, a 4-cylinder engine would include four combustion cylinders, a 6-cylinder engine would include six combustion cylinders, etc. Six combustion cylinders 112 are shown in the FIGURE.

The internal combustion engine 110 also includes an intake manifold 114 and an exhaust manifold 116. The intake manifold 114 provides fluid, for example, air or a fuel/air mixture, to the combustion cylinders 112. The exhaust manifold 116 receives exhaust fluid, for example, exhaust gas, from the combustion cylinders 112. The intake manifold 114 and the exhaust manifold 116 are shown as a single-part construction for simplicity in the drawing. However, it should be appreciated that the intake manifold 114 and/or the exhaust manifold 116 may be constructed as multi-part manifolds, depending upon the particular application.

The airflow system 100 may include a first turbocharger 120 and a second turbocharger 140. The first and second turbochargers 120, 140 may be arranged in series with one another. The first turbocharger 120 may include a first turbine 122 and a first compressor 124. The first turbine 122 may be fluidly connected to the exhaust manifold 116 via an exhaust duct 126. The first turbine 122 may include a turbine wheel 128 carried by a first shaft 130, which in turn may be rotatably carried by a housing 132, for example, a single-part or multi-part housing. The fluid flow path from the exhaust manifold 116 to the first turbine 122 may include a variable nozzle (not shown) or other variable geometry arrangement adapted to control the velocity of exhaust fluid impinging on the turbine wheel 128.

The first compressor 124 may include a compressor wheel 134 carried by the first shaft 130. Thus, rotation of the first shaft 130 by the turbine wheel 128 in turn may cause rotation of the compressor wheel 134. An intake duct 152 may provide fluid communication between the first turbocharger 120 and the intake manifold 114, such that the first compressor 124 may supply compressed air to the intake manifold 114 of the engine 110.

The second turbocharger 140 may include a second turbine 142 and a second compressor 144. A first conduit 137 may provide fluid communication between the first turbocharger 120 and the second turbocharger 140, such that exhaust from the first turbine 122 may be supplied to the second turbine 142. The second turbine 142 may include a turbine wheel 146 carried by a second shaft 148, which in turn may be rotatably carried by the housing 132. The second compressor 144 may include a compressor wheel 150 carried by the second shaft 148. Thus, rotation of the second shaft 148 by the turbine wheel 146 may in turn cause rotation of the compressor wheel 150.

The second turbocharger 140 may include an air inlet 136 providing fluid communication between the atmosphere and the second compressor 144. A second conduit 138 may provide fluid communication between the second turbocharger 140 and the first turbocharger 120, such that the second compressor 144 may supply compressed air to the first compressor 124. The second turbocharger 140 may include an exhaust outlet 154 for receiving exhaust fluid from the second turbine 142 and providing fluid communication with the atmosphere. In an embodiment, the turbochargers 120, 140 may be sized to provide substantially similar compression ratios. For instance, the first turbocharger 120 and the second turbocharger 140 may both provide compression ratios of between 1.5 to 1 and 3 to 1.

The airflow system 100 may include one or more air coolers 156 structured and arranged to extract heat from the air to lower the intake manifold temperature and to increase the air density. For example, the system 100 may include one or more air coolers 156, for example, aftercoolers, between the first compressor 124 and the intake manifold 114. Optionally, the airflow system 100 may include an additional air cooler (not shown), for example, an intercooler, between the second compressor 144 and the first compressor 124.

A wastegate valve 160 may be connected between the exhaust duct 126 and the first conduit 137. The wastegate valve 160 may be movable between a first position in which fluid flow exhausted by the engine 110 bypasses the first turbine 122 and a second position in which fluid flow exhausted by the engine 110 is restricted from bypassing the first turbine 122. The wastegate valve 160 may include a wastegate conduit 161 forming an exhaust path that is parallel to an exhaust path running to the first turbine 122. The wastegate valve 160 may include a housing 162 and a diaphragm 164 connected to the housing 162 near a perimeter of the diaphragm 164. The wastegate valve 160 may also include a valving member 166 and a spring 168 associated with the diaphragm 164. The spring 168 biases the valving member 166 to a closed position, in which the valving member 166 closes an exhaust bypass opening 170 to prevent exhaust gas from bypassing the turbine wheel 128 of the first turbine 122. A divider 172 may be attached within the housing 162 to create separate cavities within the housing 162. For example, the housing 162 may include a compressed air cavity 174 and an exhaust gas cavity 176. A third conduit 178 may fluidly couple the compressed air cavity 174 with the second compressor 144.

The airflow system 100 may include a control valve 190 associated with the third conduit 178. The control valve 190 may be operable to control the flow of compressed air from the second compressor 144 to the compressed air cavity 174 of the wastegate valve 160. For example, the control valve 190 may be an electronic pressure regulator. The system 100 may further include a controller 192 electrically coupled with the control valve 190 and configured to control the flow of compressed air through the control valve 190. The system 100 may include one or more sensors 194 associated with the engine 110 or components of the airflow system 100. The sensors 194 may be configured to sense one or more engine conditions such as, for example, engine speed, load, air temperature and/or pressure in the manifold, and air temperature and/or pressure at the first compressor 144. As one skilled in the art will recognize, the engine load can be implied from a sensed fuel command. The controller 192 may be electrically coupled with the sensors 194 and may control operation of the control valve 190 based on inputs received from the sensors 194.

The control valve 190 may be a two-position valve that either supplies pressurized fluid to the wastegate valve 160 or stops the supply. Alternatively, the control valve 190 may be a variable-position valve. For example, the controller 192 may control not only whether the control valve 190 is opened or closed, but also how far the valve 190 is opened.

INDUSTRIAL APPLICABILITY

During use, the internal combustion engine 110 operates in a known manner using, for example, the diesel principle of operation. Referring to the exemplary airflow system shown in the FIGURE, exhaust gas from the internal combustion engine 110 is transported from the exhaust manifold 116 through the exhaust duct 126 and impinges on and causes rotation of the turbine wheel 128. The turbine wheel 128 is coupled with the shaft 130, which in turn carries the compressor wheel 134. The rotational speed of the compressor wheel 134 thus corresponds to the rotational speed of the shaft 130.

Exhaust gas from the first turbocharger 120 is transported to the second turbocharger 140 via the exhaust duct 139. The exhaust gas from the first turbocharger 120 impinges on and causes rotation of the turbine wheel 146 of the second turbocharger 140. The turbine wheel 146 is coupled with the shaft 148, which in turn carries the compressor wheel 150. The rotational speed of the compressor wheel 150 thus corresponds to the rotational speed of the shaft 148. Exhaust gas from the second turbocharger 140 may be directed to the atmosphere via the exhaust outlet 154.

Rotation of the compressor wheel 150 of the second turbocharger 140 compresses air drawn from the atmosphere via the air inlet 136 to a first pressure. The compressed air may then be supplied to the compressor wheel 134 of the first turbocharger 120 via the second conduit 138. The compressor wheel 134 may further compress the air to a second pressure and supply the compressed air to the intake manifold 114 of the engine 110 via the air outlet line 152. The compressed air may be cooled by one or more air coolers 156 before reaching the intake manifold 114. Since the first compressor 124 compresses air to a higher pressure than the second compressor 144, the first compressor 124 may be referred to as a high pressure compressor and the second compressor 144 may be referred to as a low pressure compressor.

The compressed air from the compressor wheel 150 of the second turbocharger 140 may also be selectively supplied to the compressed air cavity 174 of the wastegate valve 160 via the third conduit 178. The pressure of the air exiting the compressor wheel 150 may cause the diaphragm 164 to move the valving member 166 against the biasing force of the spring 168 if the air pressure is at least a predetermined pressure. For example, if the air pressure is sufficient to cause the diaphragm 164 to compress the spring 168, then the valving member 166 will move to an open position, thereby allowing the flow of exhaust gas through the exhaust cavity 176 and through the exhaust bypass opening 170 to the first conduit 137. In this manner, when the pressurized air exiting the second compressor 144 meets or exceeds a predetermined value, the wastegate valve 160 will open thereby diverting exhaust gas from the first turbine wheel 128.

Optionally, operation of the wastegate valve 160 may be modified by the control valve 190 based on the operating conditions of the engine 110 and/or the airflow system 100. For example, the sensors 194 may be used to monitor engine operating conditions such as, for example, engine speed, boost, intake manifold pressure and temperature, engine load (implied from fuel demand), and the like. The sensors 94 may also be used to monitor airflow system operating conditions such as, for example, the temperature and pressure of compressed air leaving the first compressor 124.

The controller 192 may open or close the control valve 190 based on one or more of the monitored operating conditions. When the control valve 190 is closed, the compressed air from the second compressor 144 is not supplied to the compressed air cavity 174, and the wastegate valve 160 is closed. When the control valve 190 is at least partially opened, an amount of compressed air from the second compressor 144 is supplied to the compressed air cavity 174, and the wastegate valve 160 may be opened to some degree, depending on the bias of the spring 168. Thus, the control valve 190 may be used to control operation of the wastegate valve 160 in order to maintain desired operating conditions of the engine 110 and the airflow system 100.

In an embodiment, the engine 110 may be a four-cycle, internal combustion engine operating under a "Miller cycle." A "Miller cycle" engine modifies operation of a conventional "Otto cycle" or diesel cycle engine by modifying closing timing of an air intake valve (not shown) associated with the cylinder 112 to alter the supply of compressed air into the cylinder 112. In one exemplary embodiment, a "Miller cycle" engine may close the air intake valve during the compression stroke of the engine 110 to permit the flow of compressed air into and/or out of the cylinder 112 for a portion of the compression stroke. Optionally, the compressed air may be permitted to flow into and/or out of the cylinder 112 for more than half of the compression stroke. As a result, less compression needs to be performed in the cylinder 122, thereby reducing temperatures in the cylinder 112 and reducing the amount of compression work for the engine cycle.

Because of the potential reverse flow of air from the cylinder 112 during the compression stroke under the "Miller cycle" operation, the series turbochargers 120, 140 may be required to increase boost pressure of air supplied to the engine 110 to maintain sufficient air flow to the engine 110. As the boost increases, the temperature of the compressed air being supplied from the first compressor 124 to the intake manifold 114 may also increase to excessively high levels. Further, the compressed air leaving the second compressor 144 is at a significantly lower temperature and pressure than the compressed air leaving the first compressor 124. Thus, an exemplary embodiment of the invention supplies less-compressed and lower temperature air from the second compressor 144 to the compressed air cavity 174 to operate the wastegate valve 160. Consequently, the wastegate valve 160 may be constructed of less expensive and more readily available components. Further, using compressed air from the second compressor 144 may provide improved controllability of the wastegate valve 160 since the pressure of the compressed air has a lower magnitude.

It will be apparent to those skilled in the art that various modifications and variations can be made in the disclosed air and fuel supply system for an internal combustion engine without departing from the scope of the invention. Other embodiments of the invention will be apparent to those skilled in the art from consideration of the specification and practice of the invention disclosed herein. It is intended that the specification and examples be considered as exemplary only.

What is claimed is:

1. An airflow system for an internal combustion engine, the engine having an intake manifold and an exhaust manifold, the airflow system comprising:

a first turbocharger including a first turbine coupled with a first compressor, the first turbine being configured to receive exhaust flow from the exhaust manifold, the first compressor being configured to supply compressed air to the intake manifold;

a second turbocharger including a second turbine coupled with a second compressor, the second compressor being configured to compress air drawn from atmosphere;

a first conduit providing fluid communication between the first turbine and the second turbine;

a second conduit providing fluid communication between the second compressor and the first compressor;

a wastegate valve fluidly coupled with the exhaust manifold, the wastegate valve being movable between a first position and second position, the first position allowing fluid flow exhausted by the engine to bypass the first turbine, the second position restricting fluid flow exhausted by the engine from bypassing the first turbine; and a third conduit providing fluid communication between the second compressor and the wastegate valve, wherein the wastegate valve is moved to the first position at times when compressed air in the third conduit has at least a predetermined pressure.

2. The airflow system of claim 1, further including a spring associated with the wastegate valve, the spring biasing the wastegate valve to the second position.

3. The airflow system of claim 1, wherein the wastegate valve includes a wastegate conduit, the wastegate conduit providing fluid communication between the exhaust manifold and the first conduit when the wastegate valve is in the first position.

4. The airflow system of claim 1, further including a control valve associated with the third conduit, the valve being operable to control the pressure of compressed air being supplied to the wastegate valve.

5. The airflow system of claim 1, wherein the control valve is an electrically-controllable valve.

6. The airflow system of claim 5, further including at least one sensor configured to sense at least one operating condition of at least one of the engine and the airflow system.

7. The airflow system of claim 5, further including a controller electrically coupled to the control valve, the controller being configured to operate the control valve based on at least one monitored operating condition of at least one of the engine and the airflow system.

8. An internal combustion engine, comprising:

an intake manifold;

an exhaust manifold;

an engine block defining at least one cylinder, the cylinder being configured to receive compressed air via the intake manifold, the exhaust manifold being configured to receive exhaust flow from the cylinder;

a first turbocharger including a first turbine coupled with a first compressor, the first turbine being configured to receive exhaust flow from the exhaust manifold, the first compressor being configured to supply compressed air to the air intake manifold;

a second turbocharger including a second turbine coupled with a second compressor, the second compressor being configured to compress air drawn from atmosphere;

a first conduit providing fluid communication between the first turbine and the second turbine;

a second conduit providing fluid communication between the second compressor and the first compressor;

a wastegate valve fluidly coupled with the exhaust manifold, the wastegate valve being movable between a first position and second position, the first position allowing fluid flow exhausted by the engine to bypass the first turbine, the second position restricting fluid flow exhausted by the engine from bypassing the first turbine; and a third conduit providing fluid communication between the second compressor and the wastegate valve, wherein the wastegate valve is moved to the first position at times when compressed air in the third conduit is at least a predetermined pressure.

9. The engine of claim 8, wherein the wastegate valve includes a wastegate conduit, the wastegate conduit providing fluid communication between the exhaust manifold and the first conduit when the wastegate valve is in the first position.

10. The engine of claim 8, further including a spring associated with the wastegate valve, the spring biasing the wastegate valve to the second position.

11. The engine of claim 8, further including a control valve associated with the third conduit, the valve being operable to control the pressure of compressed air being supplied to the wastegate valve.

12. The engine of claim 11, wherein the control valve is an electrically-controllable valve.

13. The engine of claim 12, further including at least one sensor configured to sense at least one operating condition of the engine.

14. The engine of claim 12, further including a controller electrically coupled to the control valve, the controller being configured to operate the control valve based on at least one monitored operating condition of the engine.

15. A method of controlling airflow to an internal combustion engine having an air intake manifold and an exhaust manifold, the method comprising:

imparting rotational movement to a first turbine and a first compressor of a first turbocharger with exhaust air flowing from the exhaust manifold of the engine;

imparting rotational movement to a second turbine and a second compressor of a second turbocharger with exhaust air flowing from an exhaust duct of the first turbocharger;

compressing air drawn from atmosphere with the second compressor;

compressing air received from the second compressor with the first compressor;

supplying compressed air from the first compressor to the air intake manifold; and supplying compressed air from the second compressor to a wastegate valve to control flow of the exhaust air from the exhaust manifold to the first turbine.

16. The method of claim 15, further including controlling the pressure of compressed air being supplied to the wastegate valve.

17. The method of claim 15, further including:

sensing at least one operating condition of the engine; and controlling the pressure of compressed air being supplied to the wastegate valve based on the sensed condition.

18. The method of claim 15, further including permitting compressed air flow between a cylinder and an intake manifold of the engine during more than half of a compression cycle of the engine.

19. The method of claim 15, wherein the compressed air supplied from the second compressor moves the wastegate valve to a first position when the compressed air has at least a predetermined pressure, the first position allowing fluid flow exhausted by the engine to bypass the first turbine.

20. The method of claim 19, further including biasing the wastegate valve to a second position that prevents fluid flow exhausted by the engine from bypassing the first turbine.

* * * * *